(12) United States Patent
Shin et al.

(10) Patent No.: US 10,549,382 B2
(45) Date of Patent: Feb. 4, 2020

(54) LASER-ASSISTED MICROMACHINING SYSTEMS AND METHODS

(71) Applicant: Purdue Research Foundation, West Lafayette, IN (US)

(72) Inventors: Yung C. Shin, West Lafayette, IN (US); Xiangyang Dong, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 334 days.

(21) Appl. No.: 15/584,140

(22) Filed: May 2, 2017

(65) Prior Publication Data

US 2017/0320164 A1  Nov. 9, 2017

Related U.S. Application Data

(60) Provisional application No. 62/331,497, filed on May 4, 2016.

(51) Int. Cl.
*B23K 26/06* (2014.01)
*B23K 26/02* (2014.01)
*B23K 26/00* (2014.01)
*B23P 25/00* (2006.01)
*B23K 26/36* (2014.01)

(52) U.S. Cl.
CPC ...... *B23K 26/0093* (2013.01); *B23K 26/0643* (2013.01); *B23K 26/36* (2013.01); *B23P 25/006* (2013.01)

(58) Field of Classification Search
CPC ............ B23K 26/0093; B23K 26/0643; B23K 26/36; B23P 25/003; B23P 25/006
USPC ............................ 219/121.6–121.86
See application file for complete search history.

(56) References Cited

U.S. PATENT DOCUMENTS

| | | | |
|---|---|---|---|
| 4,356,376 A | 10/1982 | Komanduri | |
| 5,149,937 A * | 9/1992 | Babel | B23K 26/0823 219/121.68 |
| 5,268,554 A * | 12/1993 | Ream | B23K 26/08 219/121.8 |
| 5,329,090 A * | 7/1994 | Woelki | B23K 26/08 219/121.68 |
| 5,849,371 A | 12/1998 | Beesley | |
| 5,886,318 A | 3/1999 | Vasiliev et al. | |
| 5,906,459 A | 5/1999 | Thomas et al. | |
| 6,476,347 B1 | 11/2002 | Whittenbury | |
| 7,388,172 B2 | 6/2008 | Sercel et al. | |
| 7,709,768 B2 | 5/2010 | Sercel et al. | |
| 8,053,705 B2 | 11/2011 | Shin | |

(Continued)

*Primary Examiner* — Sang Y Paik
(74) *Attorney, Agent, or Firm* — Hartman Global IP Law; Gary M. Hartman; Domenica N. S. Hartman

(57) ABSTRACT

Laser-assisted micromachining methods and systems capable of providing flexible beam positioning and low incident angles. Such laser-assisted micromachining systems preferably include a laser beam source, a cutting tool, means for engaging a workpiece with the cutting tool, optical elements arranged to define a path of a laser beam emitted by the laser beam source wherein the optical elements include at least a first mirror mounted in fixed relation to the laser beam source, and means for adjustably mounting a second mirror to project the laser beam onto the workpiece in proximity to the cutting tool and at an incidence angle relative to a surface of the workpiece.

18 Claims, 7 Drawing Sheets

(56) References Cited

U.S. PATENT DOCUMENTS

| | | |
|---|---|---|
| 8,502,112 B2 | 8/2013 | Sercel et al. |
| 8,604,381 B1 | 12/2013 | Shin |
| 8,710,400 B2 | 4/2014 | Briand et al. |
| 8,847,114 B1 | 9/2014 | Shin |
| 2010/0099238 A1 | 4/2010 | Vakanas et al. |
| 2013/0072917 A1 | 3/2013 | Kaschke et al. |

* cited by examiner

LASER-ASSISTED MICROMACHINING SYSTEMS AND METHODS

CROSS REFERENCE TO RELATED APPLICATIONS

This application claims the benefit of U.S. Provisional Application No. 63/331,497, filed May 4, 2016, the contents of which are incorporated herein by reference.

BACKGROUND OF THE INVENTION

The present invention generally relates to laser-assisted material processing. The invention particularly relates to systems and methods for performing microscale laser-assisted machining.

With growing miniaturization of products capable of shrinking size and increasing complexity in many applications, the demand for high-precision manufacture of miniature parts (e.g., a few microns in size) having complex features has expanded to advanced engineering materials such as ceramics (including ceramic matrix composites (CMCs)), stainless steels and high temperature alloys. Micromachining techniques such as laser machining, micro milling, rotary ultrasonic machining, conventional grinding, ultrasonic slurry-based machining, micro abrasive waterjet machining, and electrical discharge machining have been considered. Particular challenges include low material removal rates and generated (machined) surfaces having less than desired properties, for example, for purposes of subsequent coating. Due to its great process flexibility, micro milling has been proposed as a particularly promising technology for the manufacture of various engineering products made of advanced engineering materials with high accuracy. However, conventional micro milling of difficult-to-machine materials still remains a technological challenge in industry due to short tool life when applied to advanced engineering materials, poor or compromised machined surface integrity, and increased risk of inducing flaws in advanced engineering materials with low fracture toughness. In addition, some advanced engineering materials react negatively to the presence of water, oil, and/or certain elements and/or compounds within cutting fluids of the types typically used in micro milling processes.

Laser-assisted micromachining (LAMM) technologies refer to micromachining techniques that employ a laser beam to assist material removal performed by another instrumentality, e.g., a cutting tool, and therefore differs from laser machining LAMM has been introduced to improve the machinability of materials with high strength, good corrosion, and wear resistance. While it is highly desirable to develop a micromachining system for processing engineering materials with good precision, technological challenges remain in integrating a laser in a miniature micromachining system while maintaining high machined quality and decreasing the tool wear to achieve longer tool life. Due to the very limited space and the nature of laser beam sources, a high incidence angle is usually incorporated in laser-assisted micromachining systems (as used herein, "incidence angle" and "angle of incidence" of a laser beam will be used to refer to the angle between a perpendicular to a surface impinged by a laser beam and the path of the laser beam at the point of impingement). To simplify micromachining operations, laser beam delivery is often fixed in space and the focused laser spot size cannot be adjusted. Such laser beam delivery designs often find limited use for many machining processes, for example, machining deep slots, pockets, or contouring, and may not be able to fully exploit the advantages of laser-assisted micromachining.

Therefore, there is a need for laser-assisted micromachining systems that are capable of greater flexibility in terms of adjusting the laser beam delivery path and laser spot size in order to extend laser-assisted micromachining to more machining (cutting) processes.

BRIEF DESCRIPTION OF THE INVENTION

The present invention provides laser-assisted micromachining methods and systems capable of providing flexible beam positioning and low incident angles.

According to one aspect of the invention, a laser-assisted micromachining system includes a laser beam source, a cutting tool, means for engaging a workpiece with the cutting tool, optical elements arranged to define a path of a laser beam emitted by the laser beam source wherein the optical elements include at least a first mirror mounted in fixed relation to the laser beam source, and means for adjustably mounting a second mirror to project the laser beam onto the workpiece in proximity to the cutting tool and at an incidence angle relative to a surface of the workpiece.

According to another aspect of the invention, a laser-assisted micromachining system includes a laser beam source having a laser head mounted to a fixed structure with a 1-axis stage and a rotatable table, a cutting tool, means for engaging a workpiece with the cutting tool, optical elements arranged to define a path of a laser beam emitted by the laser beam source wherein the optical elements include at least two mirrors mounted in fixed relation to the laser beam source and at least one additional mirror mounted in fixed relation to the cutting tool, and means for adjustably mounting the additional mirror to project the laser beam onto the workpiece in proximity to the cutting tool and at an incidence angle relative to a surface of the workpiece.

Other aspects of the invention include methods of using laser-assisted micromachining systems comprising elements described above to machine a workpiece.

Technical effects of the methods and systems described above preferably include the ability to micromachine various materials to produce complex features, while also promoting tool life and machined surface integrity even if applied to advanced engineering materials.

Other aspects and advantages of this invention will be appreciated from the following detailed description.

DETAILED DESCRIPTION OF THE INVENTION

Figure 1:
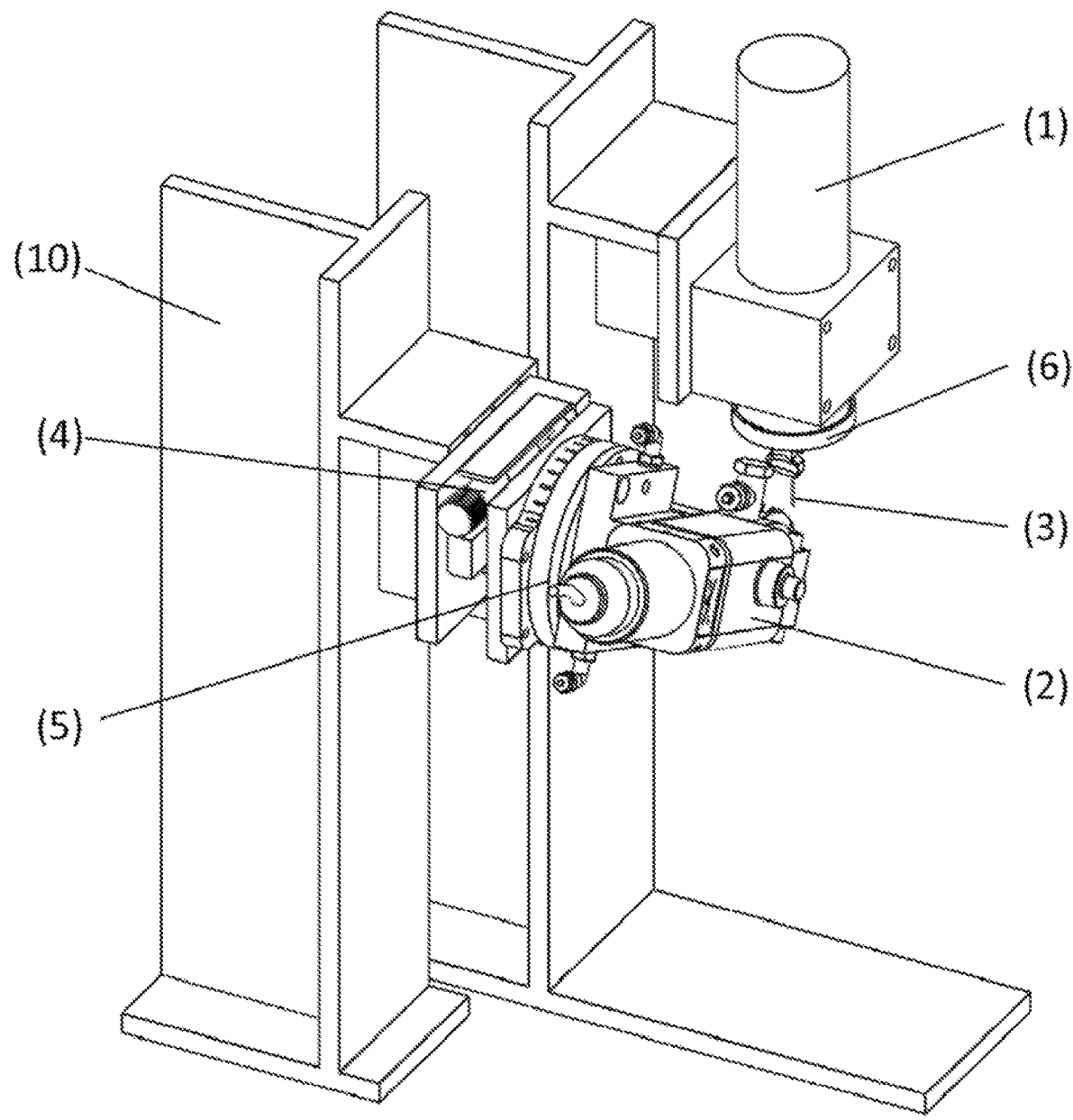
FIG. 1 schematically represents a laser-assisted micromachining system according to a nonlimiting embodiment of this invention.
Figure 2:
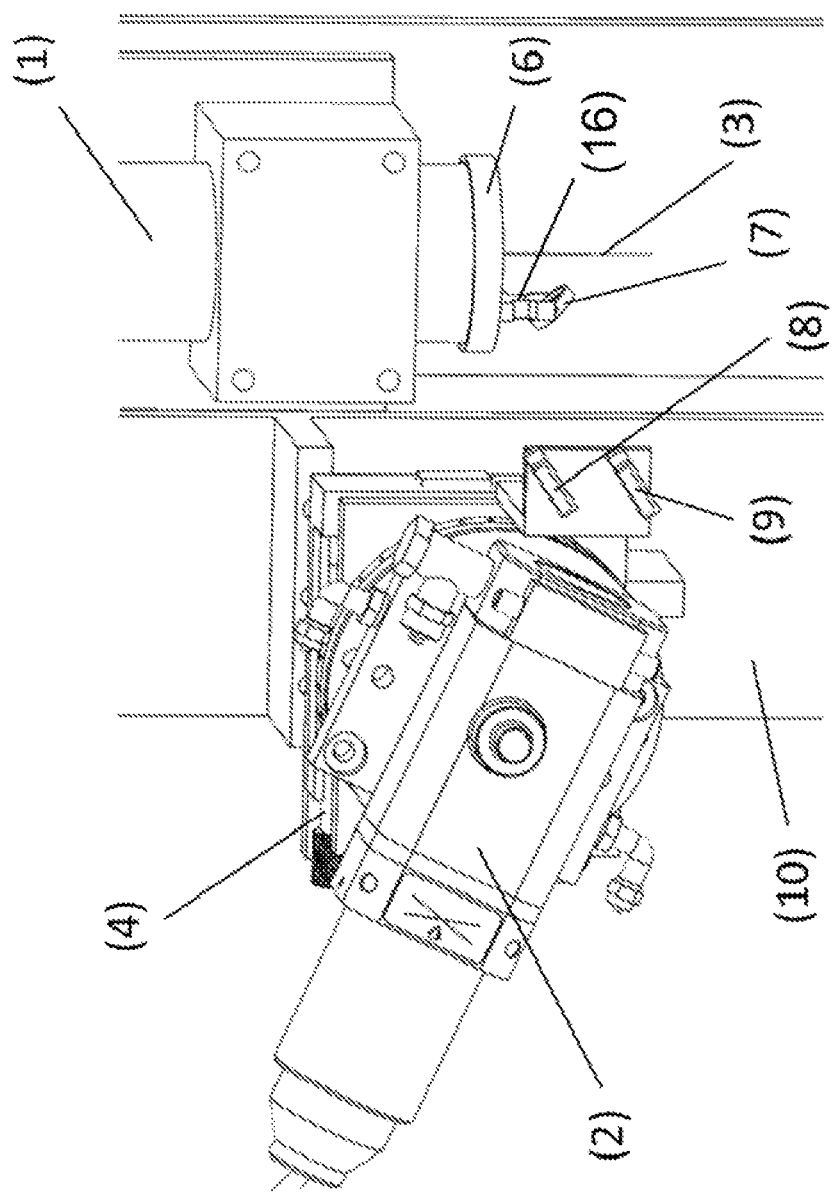
FIGS. 2 and 3 schematically represent front views of the laser-assisted micromachining system of FIG. 1.

FIGS. 1 through 7 represent certain nonlimiting aspects of a system adapted to perform laser-assisted micro milling. The system and laser-assisted micro milling methods performed thereby are preferably capable of providing micro milling capabilities for flexible machining of very difficult to machine materials, nonlimiting examples of which include advanced engineering materials such as ceramics (including CMCs) and high temperature alloys including nickel, iron, titanium, and cobalt-based alloys and metal matrix composites (MMCs). The system utilizes an integrated high-power laser beam to provide a focused laser spot that can be flexibly focused on various locations with variable beam size around a micro milling (cutting) tool at a low incidence angle with respect to the axis of the cutting tool. The flexible beam delivery mechanism of the system is capable of overcoming difficulties and limitations when attempting to apply laser-assisted micromachining to complex contouring of advance engineering materials, thus making the system suitable for a wider range of micro milling methods, including pocketing, contouring and deep slot milling. The laser spot can be adjustably positioned in advance of and in close proximity to a micro milling tool in the cutting direction to achieve localized heating capable of thermally softening a workpiece to result in lower cutting forces, longer tool life, and improved machined surface quality. The system is also preferably capable of micro milling difficult-to-machine materials at high material removal rates using different micro milling tools and methods compared to conventional systems and methods.

For the purpose of promoting an understanding of certain aspects of the system and its operation, reference will now be made to the embodiments illustrated in the drawings, and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

The drawings schematically represent a system configured to facilitate laser-assisted machining, especially though not necessarily for micromachining of difficult to machine materials on a microscale, that is, having at least one dimension of about 0.1 to 100 micrometers. FIG. 1 illustrates the laser-assisted micromachining system as including a high speed spindle 1 to which a cutting tool 3 is mounted. The spindle 1 and tool 3 are adapted to perform a micromachining process, and more particularly a micro milling process in which case the tool 3 is a micro milling tool which is rotated by the spindle 1. The system further includes a laser head 2 mounted with a 1-axis stage 4 and rotatable table 5 to a column 10 whose position is preferably fixed relative to the spindle 1 and tool 3. As more readily apparent from FIGS. 2 through 4, the micromachining system includes a series of optical elements to define a path of a laser beam 11 emitted by the laser head 2. One of the optical elements is a turning mirror 7 fixed to the spindle 1 through a rotatable fixture 6, which can be directly mounted to the spindle 1 such that the turning mirror 7 may rotate around the tool 3. Other optical elements include additional turning mirrors 8 and 9 mounted adjacent the laser head 2.

Figure 3:
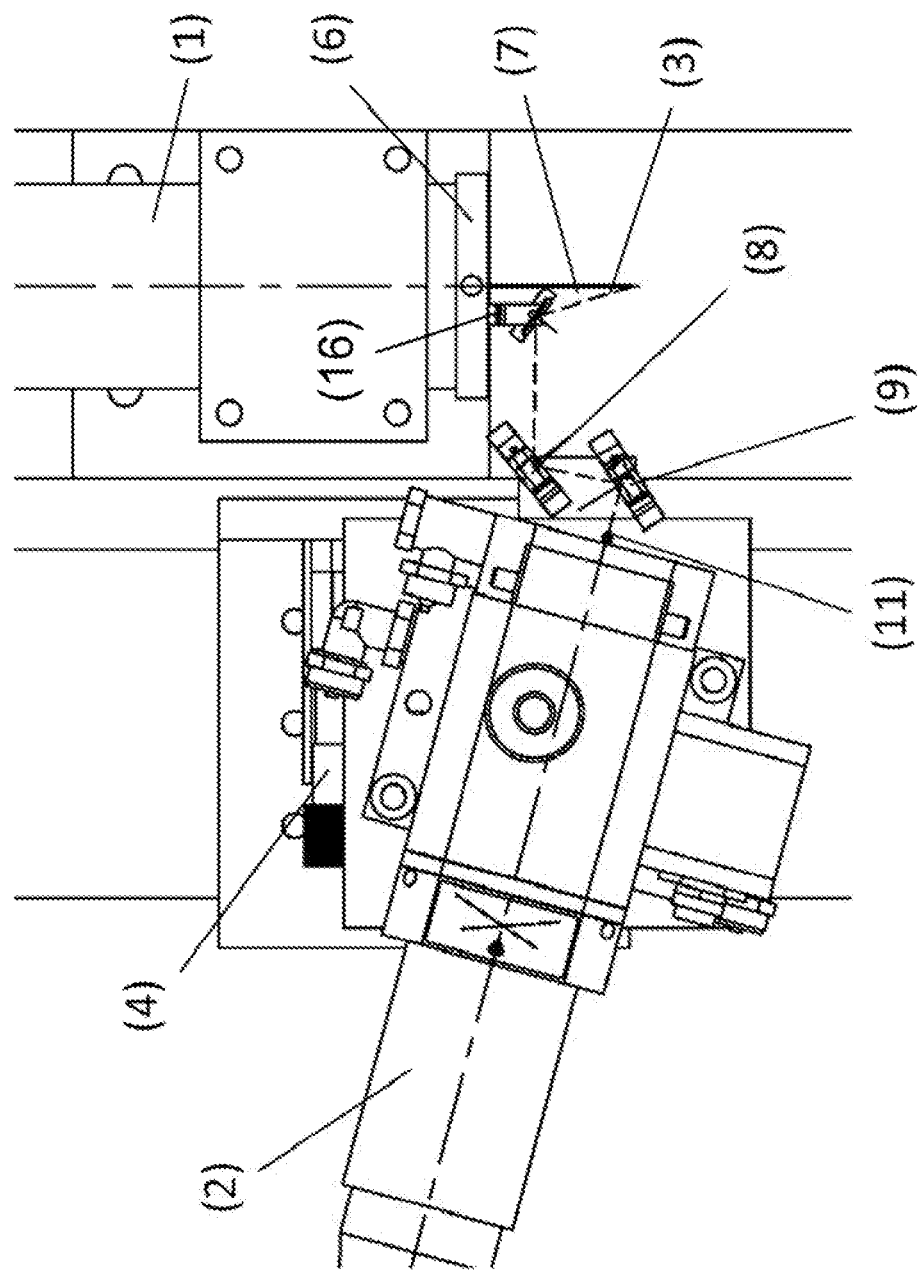
Figure 4:
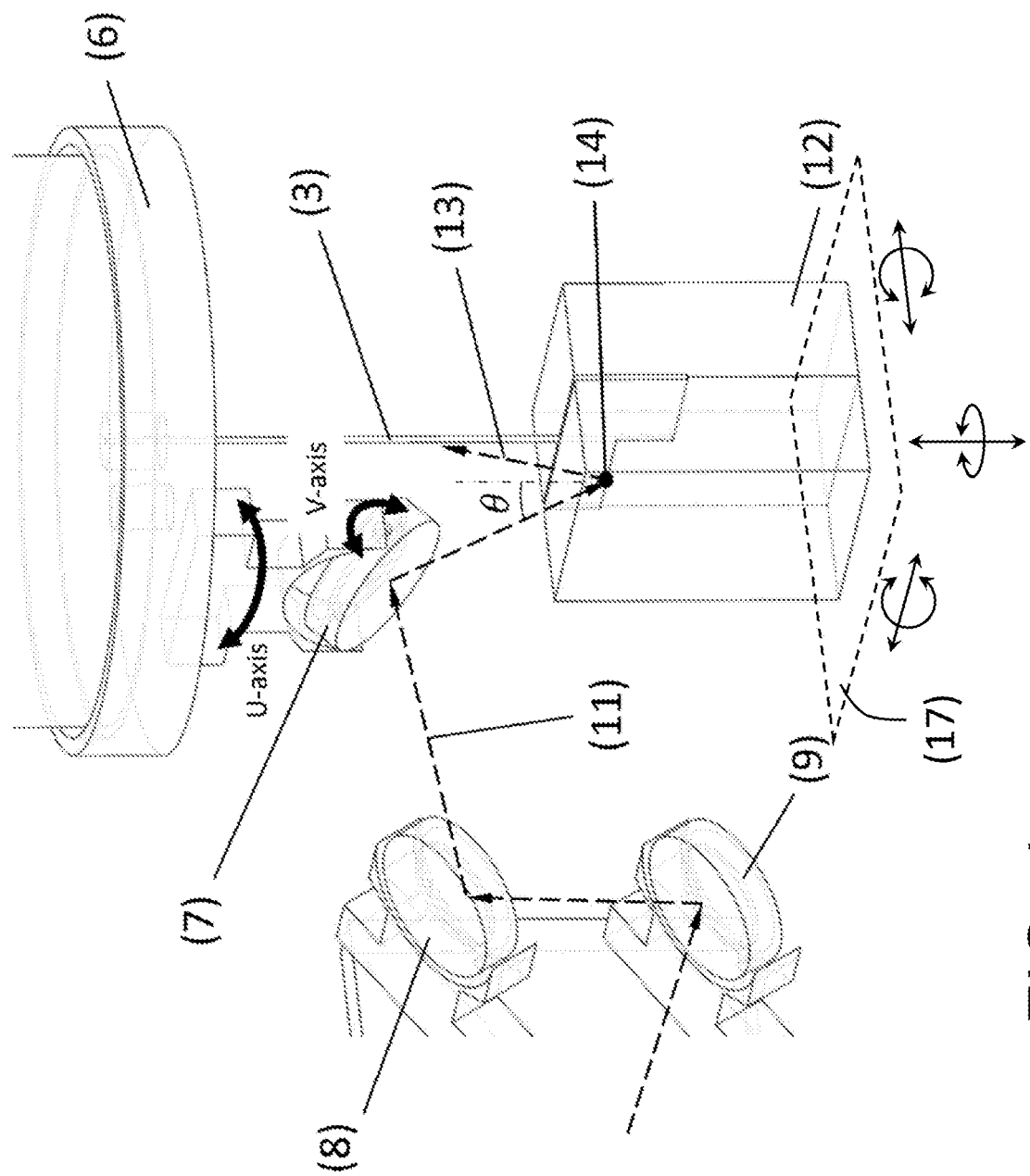
FIG. 4 depicts a nonlimiting example of a path of a laser beam within the laser-assisted micromachining system of FIG. 1 and illustrates that the alignment of the laser beam can be adjusted to achieve an arbitrary location and depth.

In the embodiment represented in FIGS. 3 and 4, the laser head 2 delivers the laser beam 11 from a laser source (not shown) to the turning mirror 9, which reflects the laser beam 11 onto the turning mirror 8. The laser beam 11 is then reflected by the turning mirror 8 onto the turning mirror 7, which delivers the laser beam 11 to a location on a workpiece 12 (FIG. 4) in proximity to the micro milling tool 3. The resultant path of the beam 11 shown in FIGS. 3 and 4 includes three redirections of the beam 11 and four beam path stages, the next-to-last stage (between the mirrors 8 and 7) being roughly perpendicular to the common axis of the spindle 1 and tool 3. In the depicted embodiment, the beam path from the turning mirror 7 to the workpiece 12 defines what will be referred to herein as the final stage path of the laser beam 11. As represented in FIG. 4, a portion 13 of the beam 11 may be reflected by the surface of the workpiece 12 impinged by the beam 11.

The angle of incidence of the laser beam 11 refers to the angle θ between the final stage path of the laser beam 11 and a perpendicular to the surface of the workpiece 12 impinged by the laser beam 11. In instances where the workpiece 12 has an uneven surface the angle of incidence will be understood to be the angle formed by the final stage path and the longitudinal axis of the micro milling tool 3. According to a preferred aspect of the invention, a lower angle of incidence of the laser beam 11 is preferred as a more circular laser spot 14 (FIG. 4) can be projected onto the workpiece 12, promoting more efficient and effective heating of the workpiece 12 and minimizing the negative effects associated with impinging the micro-milling tool 3 with the reflected portion 13 of the laser beam 11. More particularly, a sufficiently low angle of incidence (preferably less than forty-five degrees, for example, up to about fifteen degrees and potentially less than ten degrees) reduces the risk that the laser beam 11 will be directly reflected onto the cutting flutes of the micro milling tool 3, whose heating effects can result in reduced tool life. The turning mirror 7 is mounted onto the rotatable fixture 6, for example, with a holder 16 shown in FIGS. 3 and 4, to achieve independent rotational movement of the mirror 7 about two axes, identified as the U-axis (e.g., holder 16 rotating about a line parallel to the longitudinal axis of the cutting tool 3) and V-axis (e.g., about a line extending between fingers of the holder 16, in this instance, the diameter of the mirror 7 perpendicular to the longitudinal axis of the holder 16) in FIG. 4. The fixture 6 is configured in such an arrangement so that a lower angle of incidence is achieved than would be possible if the turning mirrors 7, 8, and 9 and rotatable fixture 6 were eliminated and the laser beam 11 was directly focused by the laser head 2 onto the workpiece 12 adjacent the micro milling tool 3. The lowest angle of incidence is determined by the size of the mirror 7 and its distance to the micro milling tool 3. By reducing the size of the mirror 7 and its distance to the micro milling tool 3, lower angles of incidence can be achieved. As a nonlimiting example, Part No. MM 0508 M UC, 14 mm, commercially available from Laser Research Optics, has been used to achieve an incidence angle of approximately fifteen degrees in a system of the type represented in the drawings.

From FIGS. 3 and 4, it can be appreciated that the laser beam 11 can be delivered to the workpiece 12 with the turning mirrors 7, 8 and 9, which serve as an arrangement of optical elements that incorporate reflecting angles into the beam path to result in the entire path of the beam 11 occupying a relatively small work space. The mirrors 7, 8 and 9 are considered to be optically aligned so that the laser beam 11 emitted from the laser head 2 reflects off the turning mirrors 9, 8 and 7 in sequence and is then focused on a surface of the workpiece 12. The turning mirrors 8 and 9 are depicted as being coupled to a fixed structure (preferably the 1-axis stage 4) and in close proximity to the laser head 2, in contrast to the turning mirror 7 which is mounted to the spindle 1 through the rotatable fixture 6. Such arrangement can achieve the alignment of the laser beam 11 in a more compact work space than if the mirrors 7, 8 and 9 were oriented in an optically equivalent straight line fashion. Though it is foreseeable and possible to eliminate the mirror 8 and then reflect the beam 11 with the mirror 9 directly onto the mirror 7, doing so is believed to limit the flexibility and the moving range of the laser spot 14. Due to the wide rotation range preferred for the mirror 7 with the rotatable fixture 6, a wide range of laser beam adjustments is desired before the beam 11 is reflected onto the mirror 7. The mirror 8 also promotes the ability of placing the beam path at the next-to-last stage (between the mirrors 8 and 7) roughly perpendicular to the common axis of the spindle 1 and tool 3. Such a capability allows for a smaller distance between the mirror 7 and tool 3 for a fixed size of the mirror 7, thus yielding a lower incidence angle. Preferably, the mirrors 8 and 9 are adjustable about two axes. For example, in FIG. 4 the holders 18 and 20 securing the mirrors 8 and 9, respectively, to the 1-axis stage 4 may be independently rotated about their respective longitudinal axes, in this instance, a line perpendicular to the longitudinal axis of the cutting tool 3, and the mirrors 8 and 9 may be independently rotated about a line extending between fingers of the holders 18 and 20, in this instance, diameters or radials of the mirrors 8 and 9 perpendicular to the longitudinal axis of their respective holders 18 and 20.

The diameter of the laser beam 11 at focus is referred to herein as the minimum size of the laser spot 14 projected onto the surface of the workpiece 12. The size of the laser spot 14 is affected by the diameter of the laser beam 11 generated by the laser source and the focal length of the focus lens and collimator ordinarily associated with the laser head 2. A larger diameter of the laser beam 11 generated by the laser source yields a larger beam diameter at focus. The shorter the focal length of the focus lens and the longer the focal length of the collimator, the smaller the beam diameter is at focus after passing through the laser head 2. With a given laser beam source and combination of collimator and focus lens, the range of laser spot sizes that can be projected onto the workpiece 12 can be further adjusted with the 1-axis stage 4, plus adjustment of the focal length with the laser head 2. The 1-axis stage 4 is configured to permit bi-directional movement of the laser head 2 toward and away from the spindle 1, such that a larger spot size can be achieved by moving the 1-axis stage 4 away from the target position on the workpiece 12 and increasing the focal length of the laser head 2. The rotatable table 5 between the laser head 2 and 1-axis stage 4 is configured to permit rotational movement of the laser head 2 on an axis perpendicular to the bi-directional movement of the 1-axis stage 4, such that minor adjustments of the laser beam path can be achieved in any direction along a straight line while adjusting the laser spot size. The combination of the laser head 2, 1-axis stage 4 and the rotatable table 5 makes it feasible to deliver the focused laser beam 11 with a wide range of sizes for the laser spot 14. Scales can be integrated on the laser head 2, the 1-axis stage 4, and the rotatable table 5 to help accurately adjust the size of the laser spot 14.

The rotation angles of the turning mirrors 7, 8, 9 and the rotatable fixture 6 are utilized to determine the position of the laser spot 14 on the workpiece 12. The turning mirrors 7, 8, 9 can be mounted to provide two degrees of freedom to facilitate the adjustments of the laser beam path. The turning mirror 7 is fixed directly under the spindle 1 and the rotation angle of the rotatable fixture 6 can be adjusted through adjustments of the two axes (U-axis and V-axis) of the turning mirror 7. By rotating the rotatable fixture 6, the laser beam 11 can be delivered to various positions and depths near the micro milling tool 3 according to the micromachining needs, for example, machining deep slots, while maintaining the laser spot 14 in front of the tool 3 during contouring. Because the laser beam 11 may negatively affect tool life if it is reflected directly onto the flutes of the micro milling tool 3, adjustments of the two axes (U-axis and V-axis) of the turning mirror 7 together with the rotation of rotatable fixture 6 can be used to ensure that the reflected portion 13 of the laser beam avoids such negative effects. In the depicted embodiment, all movements of the optical elements can be motorized with appropriate software to achieve automatic precision control of the laser beam path.

The arrangement of optical elements represented in the drawings also allows for the use of micro milling tools 3 with different diameters. Due to a wide range of laser spot sizes that can be provided with the micromachining system, it is possible to adjust the laser spot size according to the cutting tool size and achieve an optimum material removal temperature within the workpiece 12. At an elevated temperature resulting from thermal heating by the laser beam 11, the micro milling tool 3 may remove material from the workpiece 12 at a material removal rate higher than conventional micromachining methods, particularly while machining such difficult to machine materials such as ceramics, CMCs, and high temperature alloys.

An acoustic emission sensor (not shown) can be attached to the workpiece 12 during laser-assisted micromachining performed with the system depicted in the drawings. Common sources of acoustic emissions during cutting are plastic deformation in the workpiece 12 or chip, frictional contact at the tool surface, collisions between the chip and tool 3, chip breakage, and crack growth in the tool 3. The signals recorded can be used for monitoring and analyzing the micromachining process, for example, detecting tool workpiece contact, comparing cutting forces, and monitoring tool life.

A nozzle (not shown) can be attached to the micromachining system to provide fluid flow that can be flexibly controlled to expel chips from machining zone. Instead of liquids, it is generally preferred to use an inert gas as the fluid to remove chips and reduce the likelihood that chips will interfere with the laser beam path, and to also reduce the likelihood of oxidation and/or minimize burning of chips that can damage the micromachining system, and particularly its optical elements. An inert gas also preferably does not alter the laser heating effects of the laser beam 11 on the workpiece 12.

The micro milling tool 3 is in a fixed position during the machining process while the workpiece 12 moves relative to the micro milling tool 3 to engage the cutting tool 3 and achieve the desired cutting operation. The means for engaging the workpiece 12 with the tool 3 through movement of the workpiece 12 relative to the tool 3 can be achieved through the use of a controlled stage 17 with linear axes and rotary axes as schematically represented in FIG. 4, and can be motorized with appropriate software. A controlled stage 17 with more than three axes is preferred to achieve machining complex geometrical features on the workpiece 12. The entire operation of the stage movement can be controlled by a CNC program to coordinate with adjustment of the laser beam path and variations in spindle speed.

Figure 5:
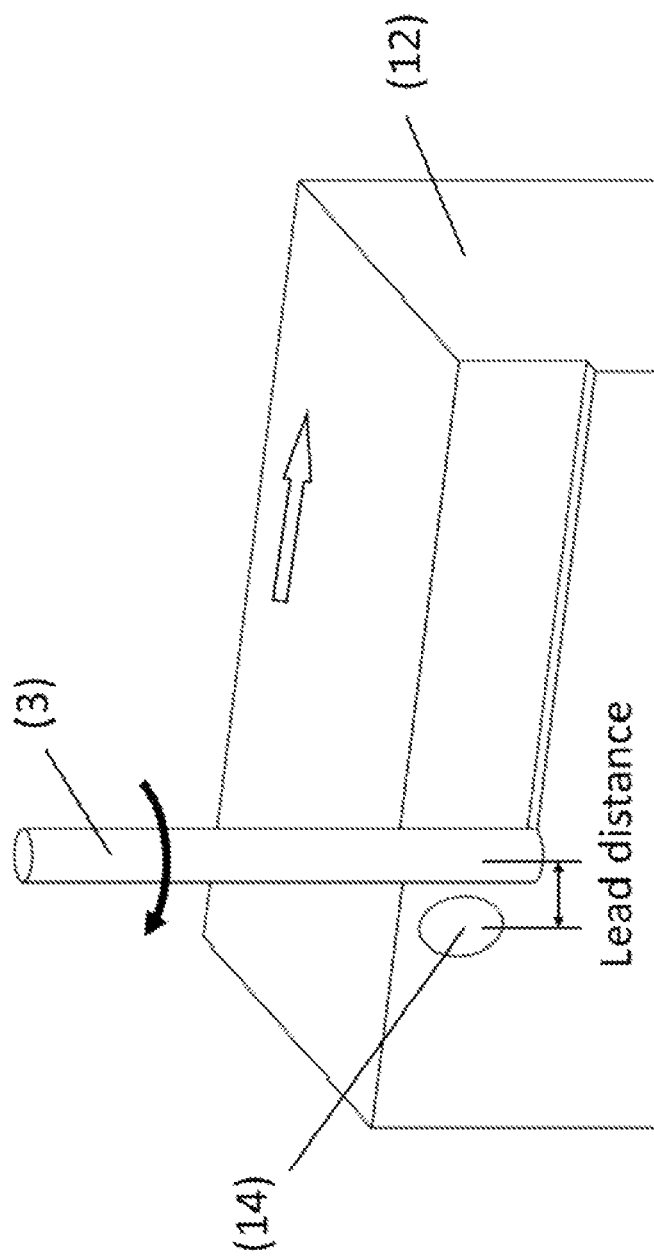
FIG. 5 schematically represents a side cutting operation that can be performed with the laser-assisted micromachining system of FIG. 1.
Figure 6:
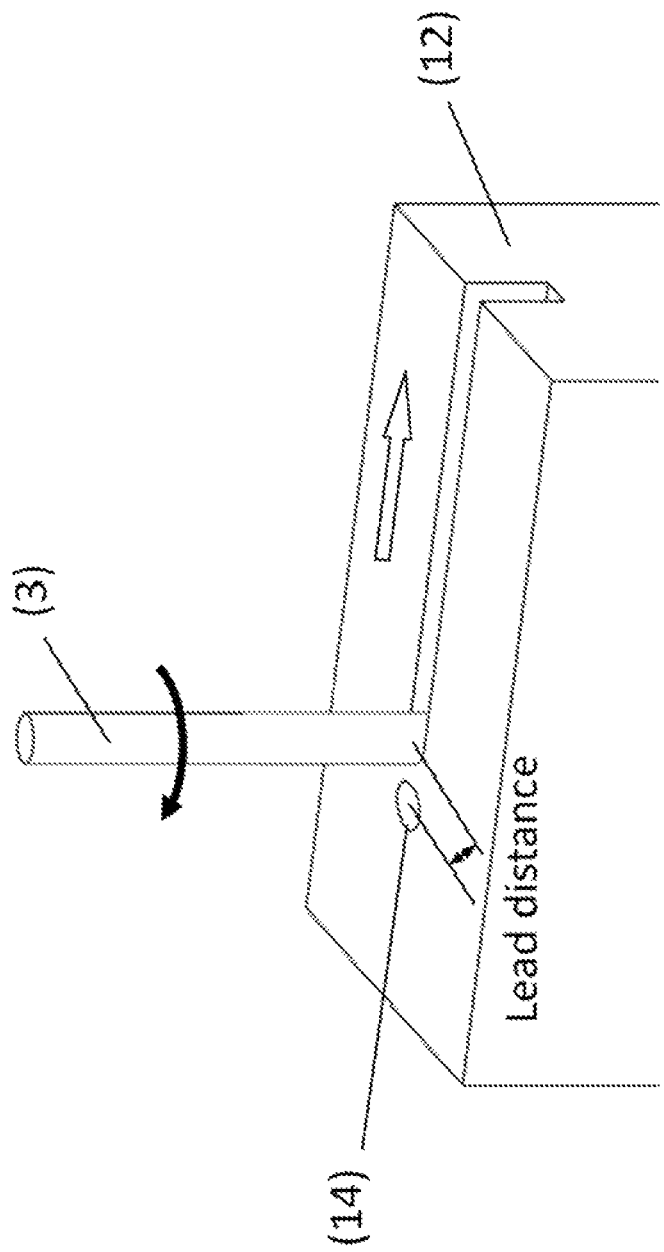
FIG. 6 schematically represents a slotting operation that can be performed with the laser-assisted micromachining system of FIG. 1.
Figure 7:
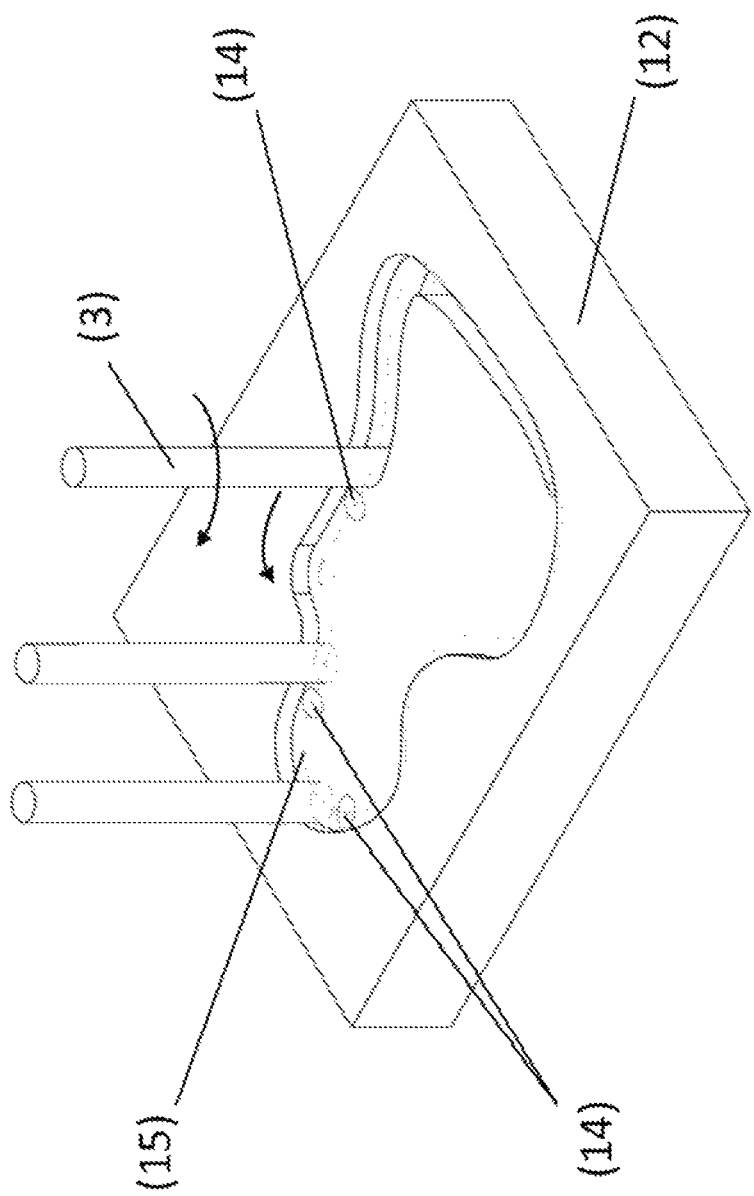
FIG. 7 schematically represents a pocketing operation that can be performed with the laser-assisted micromachining system of FIG. 1.

The laser-assisted micromachining system represented in FIGS. 1 through 4 can be configured and utilized to perform different micromachining processes, some of which are represented in FIGS. 5 through 7. FIGS. 5 and 6 represent side cutting and slotting operations, respectively. In each case, the rotatable fixture 6 is controlled to maintain the laser spot 14 precisely positioned in front of the micro milling tool 3 by a lead distance to maintain a desirable laser heating effect for the workpiece 12. As illustrated in FIG. 7, the system can also be used for laser-assisted contouring and pocketing processes. In FIG. 7, though the cutting direction of the micro milling tool 3 continuously changes along a nonlinear tool path 15, the rotatable fixture 6 can be controlled to maintain the laser spot 14 precisely positioned in front of the micro milling tool 3 by a lead distance on the tool path 15 ahead of the tool 3 to maintain a desirable laser heating effect for the workpiece 12.

In view of the foregoing, the system preferably provides the ability to integrate a spindle, laser source and optics system into a micromachining process that is capable of providing a high degree of flexibility and precise control. Certain particularly preferred features of the system include mounting the laser head 2 and the optical elements on a separate fixture to promote stability, the ability for the combination of laser head 2, 1-axis stage 4 and rotatable table 5 to deliver focused laser beams 11 having a wide range of diameters, a combination of turning mirrors 8 and 9 that promote more flexible control of the laser beam 11 delivered from the laser head 2, a rotatable fixture 6 that can be directly mounted to the spindle 1 to enable delivery of the laser beam 11 to various locations around the micro milling tool 3 to machine complex geometries associated with pocketing and contouring techniques, and flexible adjustment of the turning mirror 7 and rotatable fixture 6 to achieve a small incidence angle particularly suitable for machining deep slots.

The ability to achieve laser beam delivery at selectable focal points is believed to implement important advantages of LAMM technology. Reflection of the laser beam 11 on the cutting edges of a micro milling tool 3 can be avoided to decrease the negative effects of laser heating on tool life. Flexible adjustment of the optical elements and motorization of the optical elements promote the ability of the system to machine complex features using LAMM.

A system within the scope of the above description was demonstrated using a fiber laser with a wavelength of 1070 nm and a power level of 250 W. However, systems within the scope of the invention are not so limited, as other power levels (for example, 100-1000 W) and other lasers and wavelengths (for example, Nd:YAG lasers (1060 nm) or diode lasers (800 nm)) could be employed. Additionally, the demonstrated system employed an elliptical laser beam with a spot size of 350×250 µm, though an adjusted focused beam diameter over a wide range can be used, for example, diameters of about 50 µm to about 1 mm, which in combination with the power level of the laser beam can achieve a range of requisite power densities that promote flexibility when considering the use of different micro endmills.

While the invention has been described in terms of specific or particular embodiments, it should be apparent that alternatives could be adopted by one skilled in the art. For example, while there are significant differences between milling and other machining processes, certain principles of the present invention may be usefully applied in certain applications to laser-assisted micromachining on other types of machine tools using micro cutting tools. Further, the system and its components could differ in appearance and construction from the embodiment described herein and shown in the drawings, and functions of certain components of the system could be performed by components of different construction but capable of a similar (though not necessarily equivalent) function. Accordingly, it should be understood that the invention is not necessarily limited to any embodiment described herein or illustrated in the drawings. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. A laser-assisted micromachining system comprising:
a laser beam source;
a cutting tool;
means for engaging a workpiece with the cutting tool;
optical elements arranged to define a path of a laser beam emitted by the laser beam source, the optical elements comprising at least a first mirror mounted with mounting means that is in fixed relation to the laser beam source and at least a second mirror; and
means for adjustably mounting the second mirror to project the laser beam onto the workpiece in proximity to the cutting tool and at an incidence angle relative to a surface of the workpiece, the means for adjustably mounting the second mirror comprising a rotatable fixture that provides independent rotational movement of the second mirror about at least two axes.

2. The laser-assisted micromachining system according to claim 1, wherein the optical elements further comprise at least a third mirror mounted with mounting means that is in fixed relation to the laser beam source.

3. The laser-assisted micromachining system according to claim 1, wherein the rotatable fixture provides for the second mirror to be rotatable around the cutting tool.

4. The laser-assisted micromachining system according to claim 1, further comprising a spindle configured to rotate the cutting tool, wherein the rotatable fixture is coupled to the spindle.

5. The laser-assisted micromachining system according to claim 1, further comprising means for adjustably mounting the first mirror and means for adjustably mounting the third mirror, wherein each of the means for mounting the first and third mirrors provides independent rotational movement of the first or third mirror thereof about at least two axes to facilitate adjustments of the path of the laser beam.

6. The laser-assisted micromachining system according to claim 1, wherein the laser beam source and the cutting tool are mounted on separate fixtures and the laser beam source is independently movable relative to the cutting tool.

7. The laser-assisted micromachining system according to claim 1, wherein the laser beam source comprises a laser head mounted to a fixed structure with a 1-axis stage and a rotatable table.

8. The laser-assisted micromachining system according to claim 1, further comprising means for adjusting a spot size of the laser beam at a surface of the workpiece impinged by the laser beam.

9. The laser-assisted micromachining system according to claim 1, wherein the second mirror is adapted to project the laser beam onto the workpiece at an incidence angle of up to about fifteen degrees.

10. A method of using the laser-assisted micromachining system according to claim 1 to perform a micromachining operation of the workpiece, the method comprising sufficiently heating the workpiece in proximity to the cutting tool to achieve at least one of increased life of the cutting tool, lower cutting forces, and improved machined surface quality.

11. The method according to claim 10, wherein the micromachining operation is a side cutting operation.

12. The method according to claim 10, wherein the micromachining operation is a slotting operation.

13. The method according to claim 10, wherein the micromachining operation is a pocketing operation.

14. A laser-assisted micromachining system comprising:
a laser beam source comprising a laser head mounted to a fixed structure with a 1-axis stage and a rotatable table;
a cutting tool;
means for engaging a workpiece with the cutting tool;
optical elements arranged to define a path of a laser beam emitted by the laser beam source, the optical elements comprising at least first, second, and third mirrors, the first and third mirrors being mounted with mounting means that are each in fixed relation to the laser beam source and the second mirror being coupled to the cutting tool; and
means for adjustably mounting the second mirror to project the laser beam onto the workpiece in proximity to the cutting tool and at an incidence angle relative to a surface of the workpiece, the means for adjustably mounting the second mirror comprising a rotatable fixture that provides independent rotational movement of the second mirror about at least two axes.

15. The laser-assisted micromachining system according to claim 14, wherein the rotatable fixture provides for the second mirror to be rotatable around the cutting tool.

16. The laser-assisted micromachining system according to claim 14, further comprising means for adjustably mounting the first mirror and means for adjustably mounting the third mirror, wherein each of the means for mounting the first and third mirrors provides independent rotational movement of the first or third mirror thereof about at least two axes to facilitate adjustments of the path of the laser beam.

17. A laser-assisted micromachining system comprising:
a laser beam source comprising a laser head mounted to a fixed structure with a 1-axis stage and a rotatable table;
a cutting tool;
means for engaging a workpiece with the cutting tool;
optical elements arranged to define a path of a laser beam emitted by the laser beam source, the optical elements comprising at least first, second, and third mirrors, the first and third mirrors being mounted with mounting means that are each in fixed relation to the laser beam source and the second mirror being coupled to the cutting tool;
means for adjustably mounting the second mirror to project the laser beam onto the workpiece in proximity to the cutting tool and at an incidence angle relative to a surface of the workpiece; and
a spindle configured to rotate the cutting tool, wherein the means for adjustably mounting the second mirror comprises a rotatable fixture coupled to the spindle that provides independent rotational movement of the second mirror about at least two axes and provides for rotational movement of the second mirror around the cutting tool.

18. The laser-assisted micromachining system according to claim 17, further comprising means for adjustably mounting the first mirror to the 1-axis stage and means for adjustably mounting the third mirror to the 1-axis stage, wherein each of the means for mounting the first and third mirrors provides independent rotational movement of the first or third mirror thereof about at least two axes to facilitate adjustments of the path of the laser beam.

* * * * *